P. WHITEHEAD.
MEANS AND METHOD OF CATCHING FISH.
APPLICATION FILED NOV. 6, 1919.
1,340,677.
Patented May 18, 1920.
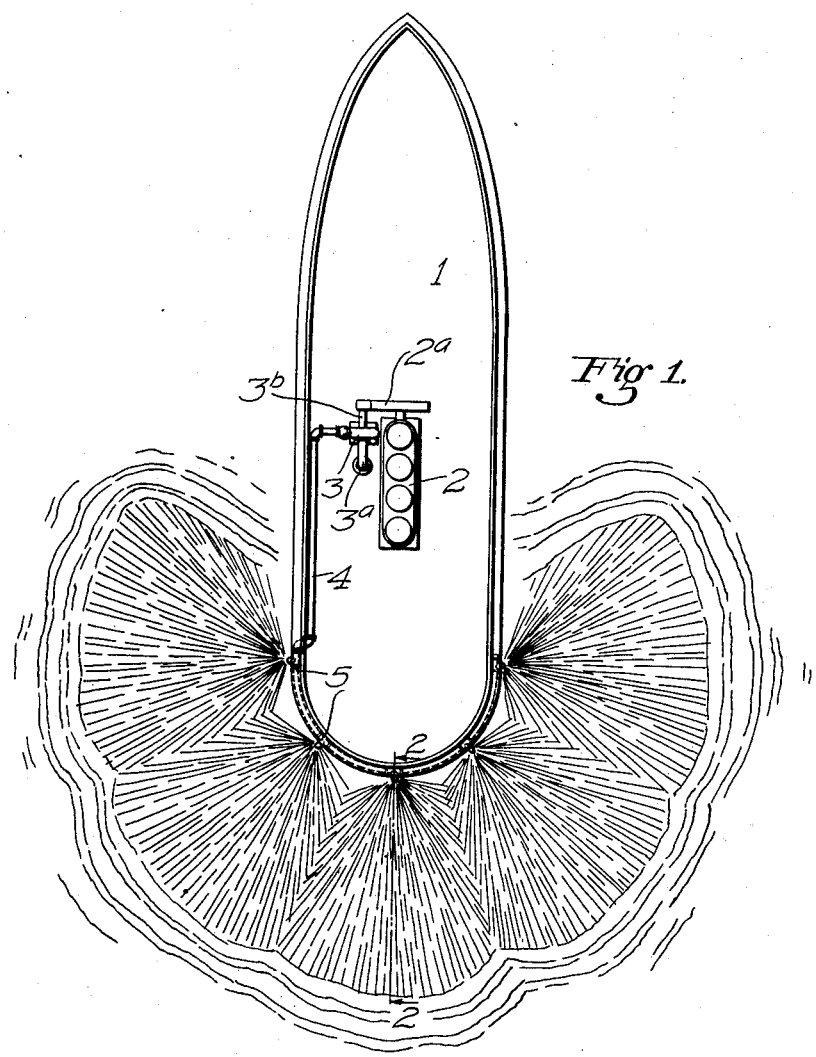
Fig 1.
Fig 2.
INVENTOR.
PAUL WHITEHEAD
BY 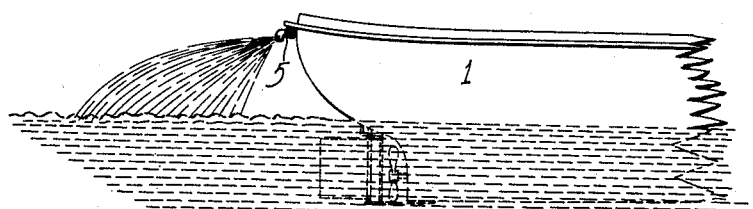
ATTORNEY

UNITED STATES PATENT OFFICE.

PAUL WHITEHEAD, OF SAN DIEGO, CALIFORNIA.

MEANS AND METHOD OF CATCHING FISH.

1,340,677.                Specification of Letters Patent.     Patented May 18, 1920.

Application filed November 6, 1919. Serial No. 336,145.

*To all whom it may concern:*

Be it known that I, PAUL WHITEHEAD, a citizen of the United States, residing at San Diego, in the county of San Diego and State of California, have invented a certain new and useful Means and Method of Catching Fish, of which the following is a specification.

My invention relates to a means and method of catching fish and is founded upon and calculated to operate in harmony with the natural traits, habits and characteristics of certain species of food fish which are well known to experienced offshore fishermen by reason of many years of intelligent observation and actual labor on and off of the fish school banks and in the handling of fishing apparatus in all weathers and seasons under different conditions of operation.

It is commonly agreed in the fishing business beyond the moot question that a condition of cloudiness of sky and opaqueness of the surface of the water present during a precipitation of light rain are the very best conditions for catching fish and promotes the most effective use of suitable apparatus when such conditions obtain and while the boat is at rest or under way a hook or jig on a fishing line with or without live or dead bait is dropped on the surface of the water and sinks a short distance below, the instincts of the fish impel them to eagerly take the hook in search of food. Under these circumstances the boat, fishermen and appliances above water are almost obscured from the vision of the fish which in response to natural traits are enticed or allured to take the food bait or hook and are thus caught.

Many of the varieties of fish best for food purposes are known as ground fish in that it is of their habits to live and spawn near and upon the bottom sea grass and growths and rise periodically to and near the surface in search of food at which time such fish are hungrily gamey and eagerly pursue the bait. It is important while thus fishing to observe quiet and undisturbing behavior making little noise or commotion which of course would tend to produce concussion of the water and surely alarm the fish and frighten them from the vicinity of the boat and bait.

The objects of my invention concisely are therefore: First, to provide a means and method of alluring the fish to and around a vessel or other object to facilitate catching them; second, to provide a means and method of producing a gently rippled condition of the surface of the water in order to obscure the vessel, fishermen and fishing apparatus from the view of the fish while fishing; third, to provide a means and method whereby the catching of fish may be greatly facilitated and fourth, to provide a means and method of this class which is very simple and economical of construction, easy to install, easy and economical to operate and which will not readily deteriorate or get out of order.

With these and other objects in view as will appear hereinafter, my invention consists of certain novel features of construction, and a certain novel method of catching fish as will be hereinafter described in detail and particularly set forth in the appended claims, reference being had to the accompanying drawings and to the characters of reference thereon which form a part of this application, in which:

Figure 1 is a top or plan view of a fishing vessel illustrating the use of my means and method of catching fish and Fig. 2 is a sectional view through 2—2 of Fig. 1 showing a fragmentary portion of the vessel in elevation to facilitate the illustration.

Similar characters of reference refer to similar parts and portions throughout the views of the drawings.

The vessel 1, engine 2, pump 3, conductor 4, and sprinkling devices 5, constitute the principal parts and portions of my means for carrying out my method of catching fish.

The vessel 1 and engine 2 are of the ordinary or conventional type in use for fishing purposes. Mounted in close proximity with the engine is a pump 3, the inlet portion of which communicates with the body of water upon which the vessel floats by means of a conductor $3^a$. This pump is operated by means of a shaft $3^b$ which is operated by the engine 2 by means of friction drive $2^a$. The outlet of the pump 3 communicates with a conductor 4 which is preferably an ordinary water pipe which extends aft and around the stern of the vessel, preferably beneath the upper rail for protection, and this pipe 4 is provided with a plurality of suitably spaced sprinkling devices for spraying the water forced by said pump and conducted by said pipe and spreading it over an area surrounding that portion of the vessel from which it is desired to fish. It will be here noted that the water is pumped from the body of water by the regular engine by means of a pump and forced through the conducting pipe 4 and out through the sprinkling devices 5 causing a continuous spray of water to fall upon the water near that portion of the vessel from which it is desired to fish, and effecting the rippled and agitated condition of the surface of the water desired.

Though I have shown and described a particular means and method of luring or attracting fish and obscuring the view of the vessel, fishermen and fishing apparatus from the view of the fish while fishing, I do not wish to be limited to this particular means nor to the method described but desire to include in the purview of my invention the construction, combination, arrangement and methods as set forth in the appended claims.

It may be seen from the foregoing statement of facts relating to traits and habits of fish that with this means and method the surface of the water will be rippled in such a manner as to produce a gentle rain like disturbance upon and near the surface of the water and causing rain like conditions which tend to attract the fish by reason of their natural traits and habits; the view of the fish will also be obscured because of this rippled condition of the surface in which circumstances the fishermen can then proceed to fish without being seen by the fish.

Having thus described my invention what I claim as new and desire to secure by Letters Patent, is:

1. In a means of the class described, the combination with a fishing vessel and its engine, of a pump with its inlet communicating with the body of water in which the vessel is located, a conductor communicating with the outlet of said pump and secured around the portion of said vessel contiguous to where it is desired to fish, and a sprinkling device communicating with said pipe adapted to gently sprinkle water onto the upper surface of the water surrounding a portion of said vessel whereby a gentle rain like agitation of the surface of the water is produced.

2. In a means of the class described the combination with a fishing vessel and its engine, of a pump with its inlet communicating with the body of water in which the vessel is located, a conductor communicating with the outlet of said pump and secured around the portion of said vessel contiguous to where it is desired to fish and a plurality of suitably spaced sprinkling devices communicating with said pipe adapted to gently sprinkle water over the upper surface of the water surrounding a portion of said vessel whereby a gentle rain like agitation of the water is produced.

3. The herein described method of catching fish consisting in gently sprinkling water contiguous to a fishing base for the purpose of gently disturbing the surface only of the water whereby said base is obscured from view of the fish.

4. The herein described method of alluring fish in fishing consisting in gently sprinkling water over an area surrounding a portion of a fishing base, then catching the fish by operating above and through the sprinkling water.

5. The herein described method of obscuring the view of fish from a fishing object and apparatus, consisting in gently sprinkling water over an area surrounding a portion of the object and appartus, then catching the fish by operating above and through the sprinkling water.

6. The herein described method of both alluring fish and obscuring their view in fishing consisting in pumping water from the body of water in which the fish are located, then gently sprinkling said water over an area in which it is desired to fish, then catching the fish from a position over the gentle sprays of water.

In testimony whereof I have hereunto set my hand at San Diego, California, this 31st day of October.

PAUL WHITEHEAD.